United States Patent [19]

Ishikawa et al.

[11] Patent Number: 5,078,028

[45] Date of Patent: Jan. 7, 1992

[54] HYDRAULIC CONTROL DEVICE WITH CUTBACK VALVE FOR AN AUTOMATIC TRANSMISSION

[75] Inventors: Kaunori Ishikawa, Toyota; Hideo Tomomatsu, Nagoya; Tadashi Kondo; Yuji Kashihara, both of Toyota; Kazumasa Tsukamoto, Toyota; Takuji Taniguchi, Wakamatsu; Kunihiro Iwatsuki, Toyota; Hiroji Taniguchi, Toyota, all of Japan

[73] Assignees: Aisin Aw Co., Ltd., Anjo; Toyota Jidosha Kabushiki Kaisha, Toyota, both of Japan

[21] Appl. No.: 313,235

[22] Filed: Feb. 21, 1989

[30] Foreign Application Priority Data

Feb. 20, 1988 [JP] Japan .................. 63-37882
Mar. 16, 1988 [JP] Japan .................. 63-63829
Mar. 16, 1988 [JP] Japan .................. 63-63830
Mar. 16, 1988 [JP] Japan .................. 63-63831

[51] Int. Cl.⁵ .......................................... F16H 59/70
[52] U.S. Cl. ................................. 74/868; 74/869
[58] Field of Search .................. 74/868, 869, 867

[56] References Cited

U.S. PATENT DOCUMENTS

| | | | |
|---|---|---|---|
| 3,703,110 | 11/1972 | Uozumi et al. | 74/868 |
| 3,714,836 | 2/1973 | Pierce, Jr. et al. | 74/869 X |
| 4,314,488 | 2/1982 | Lauven | 74/868 X |
| 4,325,271 | 4/1982 | Iwanaga et al. | 74/868 X |
| 4,432,255 | 2/1984 | Borman et al. | 74/868 X |
| 4,563,918 | 1/1986 | Sugano | 74/869 |
| 4,727,773 | 3/1988 | Sumiya et al. | 74/867 |
| 4,790,217 | 11/1988 | Kawano et al. | 74/868 |
| 4,870,877 | 10/1989 | Hasegawa et al. | 74/869 |
| 4,945,482 | 6/1990 | Nishikawa et al. | 74/869 X |

Primary Examiner—Leslie A. Braun
Assistant Examiner—Khoi Q. Ta
Attorney, Agent, or Firm—Wendroth, Lind & Ponack

[57] ABSTRACT

A primary regulator valve has a cutback port which regulates a line pressure to increase, at the first speed of D range, a throttle pressure is applied to the cutback port through a cutback valve. The primary regulator valve sets the line pressure from a line pressure port higher. The cutback valve has a spool which is compressed in one direction. A first control chamber which is connected to a hydraulic servo (for example, a second brake hydraulic servo) which hydraulic pressure is applied at more than the second speed is formed against the pressing direction, a second control chamber which is connected to a hydraulic servo (for example, a second-coast brake hydraulic servo) to limit a coasting condition of the second speed is so formed as to follow the above pressing direction. At the second speed of second range, the cutback valve, as the first speed of D range, the throttle pressure is applied to the cutback port. Furthermore, the primary regulator valve has a control chamber which regulates the line pressure to decrease. A pressure control valve (for example, a linear solenoid valve to control a lock-up clutch) is connected to the control chamber to reduce the line pressure when a manual valve is selected from N range to D or R range.

5 Claims, 5 Drawing Sheets

FIG. 5

| POSITION | | SOLENOID | | | CLUTCH | | | BRAKE | | | | ONE-WAY CLUTCH | | |
|---|---|---|---|---|---|---|---|---|---|---|---|---|---|---|
| | | S1 | S2 | S4 | C1 | C2 | C0 | B1 | B2 | B3 | B0 | F1 | F2 | F0 |
| P | | O(x) | X | X | X | X | O | X | X | X | X | X | X | X |
| R | | O(x) | X | X | X | O | O | X | X | O | X | X | X | O |
| R (V≥7) | | O(x) | O | X | X | X | O | X | X | X | X | X | X | O |
| N | | O(x) | X | X | X | X | O | X | X | X | X | X | X | X |
| D | 1ST | O | X | X | O | X | O | X | X | X | X | X | ⊗ | O |
| | 2ND | O | O | ⊚ | O | X | O | X | O | X | X | ⊗ | X | O |
| | 3RD | X | O | ⊚ | O | O | O | X | O | X | X | X | X | O |
| | 4TH | X | X | ⊚ | O | O | X | X | O | X | O | X | X | X |
| 2 | 1ST | O | X | X | O | X | O | X | X | X | X | X | ⊗ | O |
| | 2ND | O | O | ⊚ | O | X | O | O | O | X | X | O | X | O |
| | 3RD | X | O | ⊚ | O | O | O | X | O | X | X | X | X | O |
| | (3RD) | X | X | X | O | O | O | X | O | X | X | X | X | O |
| L | 1ST | O | X | X | O | X | O | X | X | O | X | X | O | O |
| | 2ND | O | O | X | O | X | O | O | O | X | X | O | X | O |
| | (1ST) | X | X | X | O | X | O | X | X | O | X | X | O | O |

| REMARKS | O | ON | ENGAGE | LOCK |
|---|---|---|---|---|
| | X | OFF | RELEASE | FREE |
| | ⊚ | ON·L·UP ON / OFF·L·UP OFF | | |
| | ⊗ | | | FREE AT COSTING |

HYDRAULIC CONTROL DEVICE WITH CUTBACK VALVE FOR AN AUTOMATIC TRANSMISSION

BACKGROUND OF THE INVENTION

1. Field of the Invention

The present invention relates to a hydraulic control device for an automatic transmission which is in particular mounted on an automobile, and which more particularly relates to a line pressure control device and the structure of a primary regulator valve and a cutback valve.

2. Description of the Prior Art

Conventionally, a hydraulic control device for an automatic transmission mounted on an automobile has a cutback valve. The cutback valve has a control chamber to which hydraulic pressure is applied at a speed greater than the second speed, an input port to which a throttle pressure is applied and an output port which supplies the input pressure to the throttle valve as a cutback pressure.

When operating at the first speed, because hydraulic pressure is not applied to the second brake hydraulic servo, the input port and output port of the cutback valve are disconnected, so that the cutback valve applies no cutback pressure to the throttle valve. Under this condition, because the throttle valve is supplied with no cutback pressure at the spool return side, the throttle valve makes the line pressure a comparatively high throttle pressure, and this high throttle pressure is applied to the primary regulator valve, so that the line pressure is set comparatively high, and a high clutch engaging force is generated corresponding to a high load torque at the time of starting. At the second speed, hydraulic pressure is applied to the second brake hydraulic servo, so that the input port and the output port of the cutback valve are switched so as to be connected, and the cutback pressure is applied to the throttle valve. Under this condition, the throttle valve is supplied with the cutback pressure at the spool return side, so that a comparatively low throttle pressure is generated, and this low throttle pressure is applied to the primary regulator valve. As a result, the line pressure is set to be low, so that the engaging force of clutch and brake is low to prevent shock during shifting.

With regard to the above line pressure control, as explained, the cutback pressure is applied to the throttle valve. Consequently, in the throttle valve at a top end of the spool, a spring from a downshift plug is applied, while at a bottom end of the spool, a return spring is applied. Furthermore, the throttle valve has three areas on the spool: an area to regulate the line pressure to the throttle; a first step area where a feedback pressure is caused by the throttle pressure is applied; and a second step area where the cutback pressure is applied. Due to this arrangement, the spool has a three-step structure.

Such three-stage structure makes the throttle valve more complicated because the throttle valve normally has a downshift plug and a throttle cam having a power to assist mechanism. Thus, forming of the valve requires intricate work and is laborious, and the cross section area of the step areas may be small. Consequently, the hydraulic response is not sufficient, and furthermore, the structure is complicated and the average diameters of the spool may be small, so that valve sticking caused by foreign materials may easily occur.

At the second speed range, the cutback valve is in the connected condition at the second speed, so that the line pressure is set to be comparatively low. Consequently, if a vehicle attempts to get out of a tire rut or start on a snowy road, the line pressure is comparatively low even at the second speed starting, so that the engaging force of the frictional engaging elements is sufficient, and efficient starting is not performed.

Generally, with regard to an automobile having an automatic transmission, when a selection lever is operated from the neutral to the drive D or the reverse R range, the line pressure is applied to a hydraulic servo of one of several frictional engaging elements, one of the frictional engaging elements (a forward clutch, a direct clutch or a first and reverse brake) are suddenly engaged, and so-called selecting shock may occur.

SUMMARY OF THE INVENTION

A first object of the present invention is to apply a cutback pressure from a cutback valve to a primary regulator valve to enhance response of the line pressure control and reliability.

A second object of the present invention is to simplify the structure of the primary regulator valve to prevent valve sticking.

A third object of the present invention is to apply the cutback pressure at the second speed of the second (S) range as well as the first speed to enable starting from the second speed condition.

And a fourth object of the present invention is to control the primary regulator valve to prevent selection shocks when shifting not only from the N to D range but also from the N to R range without adding any special devices.

The present invention, taking the above-described situation into consideration, provides, for example as shown in FIG. 1, the following arrangement: in a hydraulic control device for an automatic transmission having hydraulic servos for a clutch and a brake which engage and release certain elements of a transmission gear mechanism, there is provided a primary regulator valve 52 which regulates the line pressure applied to the servos, an output-responsive valve 53, for example, a throttle valve; and a cutback valve 59 which generates cutback pressure at a certain shifting stage. The primary regulator valve 52 has a cutback port j which regulates the line pressure to control its rise, and the port j is connected to a port j1 of the cutback valve 59. At a certain shifting stage, an input port q of the cutback valve 59 and the port j1 are connected so that hydraulic pressure of the output-responsive valve 53 is applied to the cutback port j. Due to this operation, the primary regulator valve 52 is regulated to raise the line pressure by a certain amount.

The primary regulator valve 52 has a main spool 52a, a sub spool 52b and a plug 52c. The main spool 52a regulates the line pressure at the pressure port p2 and connects to a secondary regulator valve h to regulate a hydraulic pressure converter. And to an inlet d1 at one end of the plug, to an inlet i at one end of the sub spool and to an inlet j at a step section of the sub spool are applied the line pressure for reverse running, an engine output-responsive pressure from the output-responsive valve 53 and the cutback pressure from the cutback valve 59, respectively, to raise the line pressure.

The cutback valve 59 has a spool 59a, one of whose ends is pressed by spring 59b, a first control chamber o1 located at the end toward which the spool is pressed, a second control chamber s located at the end from which the spool is pressed, an input port q which is supplied with the engine output-responsive pressure (for example, throttle pressure), an output port j1 which supplies the output-responsive pressure to the primary regulator valve 52 and a drain port EX. The first control chamber o1 is connected to a certain hydraulic servo from which hydraulic pressure is supplied at a speed greater than the second speed (for example, the second brake hydraulic servo HB2) and the second control chamber s is connected to a hydraulic servo to limit the coasting state during the second speed (the second coast brake hydraulic servo). The line pressure is set to be rather high at the coast-limited state of the second speed as well as the first speed.

The primary regulator valve 52 has a control chamber at an inlet e which regulates the line pressure to reduce it, and the chamber e receives a control pressure from the control valve S4. The pressure control valve S4 is controlled by a signal from a sensor 47 which detects a selected position of a manual valve 51 (see FIG. 4), so that the control hydraulic pressure is applied to the chamber e from the pressure control valve S4 during the operation from the neutral range N to the drive range D, or the drive range D to the reverse range R.

As one example, the pressure control valve is a linear solenoid valve S4 which controls a lock-up clutch, and the control pressure from the valve S4 is applied to the control chamber e of the primary regulator valve 52 through a solenoid relay valve 58.

The solenoid relay valve 58 is switched by the hydraulic pressure which is applied to a certain hydraulic servo (for example, the second brake hydraulic servo HB2) at a speed greater than the second speed.

Based on the above structure, at the first speed of the D range, for example, as no hydraulic pressure is applied to the second brake hydraulic servo HB2, the cutback valve 59 is at the left half position due to the pressing force of the spring 59b, and the input port q and the output port j1 are connected. At this stage, the output-responsive pressure from the output-responsive valve 53 (throttle valve) is applied to the cutback pressure port j of the primary regulator valve 52 through the port q and the port j1. Due to the application of pressure, in the primary regulator valve 52, the spool 52a and the main spool 52b are moved downward to the left half position, so that the drain port EX is about to be closed to make the line pressure at the line pressure port p2 rather high. At the second speed of the D range, as hydraulic pressure is applied to the second brake hydraulic servo HB2, the pressure is applied to the first control chamber o1, and thus the cutback valve 59 is switched to the right half position, the port j1 and the port q are disconnected, and the port j1 is connected to the drain port EX. No hydraulic pressure is applied to the cutback pressure port j, the primary regulator valve 52 is kept at the right half position, and the line pressure port p2 and the drain port EX are connected so that the line pressure is caused to be rather low.

With reference to the primary regulator valve 52, the output-responsive pressure (throttle pressure) is applied to the port i, the main spool 52a is pressed downward through the sub spool 52b, while a feedback pressure branched from the line pressure is applied to the lower control chamber f, so that these two hydraulic pressures i and f are balanced to determine the line pressure. In addition to the balance of these pressures, due to the cutback pressure at the port j, the line pressure is made rather high. When the manual valve 51 (see FIG. 4) is positioned in the reverse range R, the line pressure is applied to the port d of the manual valve 51, and the line pressure is applied to the port d1 of the primary regulator valve 52. Because of this, the main spool 52a is pressed downward through the plug 52c and the sub spool 52b, so that the line pressure is set to be higher than in the case when the cutback pressure is being applied.

When the manual valve 51 (see FIG. 4) is positioned in the second S range at the second speed, the line pressure is applied to the second-coast brake hydraulic servo HB1, thus the line pressure is applied to the second control chamber s of the cutback valve 59. In this state, although the line pressure is applied to the first control chamber o1, by the spring 59b the cutback valve 59 is in the left half position, so the port q and the port j1 are connected. Then, the cutback pressure is applied to the primary regulator valve 52 so that the line pressure from the port p2 is set to be high as at the first speed. Due to this condition, a strong engaging force acts on the frictional engaging elements, so that starting from the second speed is effectively performed.

On the other hand, when a driver shifts the manual valve 51 from the neutral range N to the drive range D or the reverse range R, the control unit C generates a certain signal based on the response of the sensor 47 which senses the position of the manual valve 51. The line pressure port p2 is connected to the drain port EX at a certain flowthrough ratio. Consequently, the hydraulic pressure to each hydraulic servo is reduced, so that selecting shock during the selecting operation is lightened.

Incidentally, with regard to the control to reduce the line pressure based on the operation of the pressure control valve S4, one possible operation is that pressure is reduced simultaneously with the selecting operation of the manual valve 51 (from N range to D range or from N range to R range), and after that the pressure gradually rises so that the pressure comes to normal hydraulic pressure after a certain time by a timer control to lighten only a selecting shock; another possible operation is that the pressure reduced condition is kept until signals generated by the throttle sensor 47 and the like at starting are sent to the control unit C, and then the pressure reduced condition is started by the starting signal to prevent not only the selecting shock but also creeping which occurs during the selecting operation.

Incidentally, the reference numerals are used only for reference to the drawings and do not define the invention. The same element may be named differently in the following description and in the previous description in which broader concepts are adopted.

BRIEF DESCRIPTION OF THE DRAWINGS

FIG. 5 is a table of operation showing the operation of solenoid valves, clutches, brakes and one-way clutches at each shifting position.

DETAILED DESCRIPTION OF THE PREFERRED EMBODIMENT

The present invention will now be explained with reference to the drawings.

Figure 2:
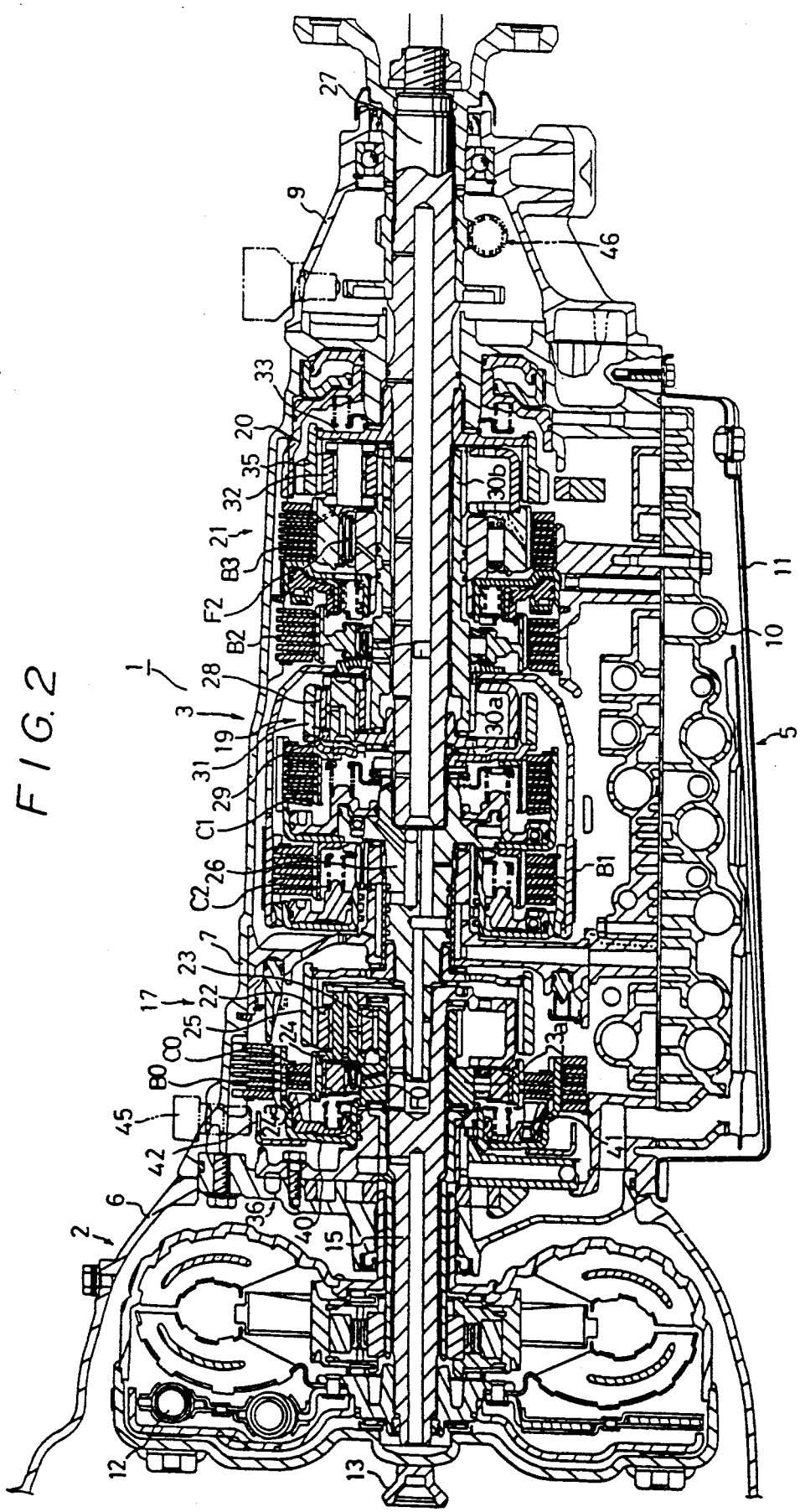
FIG. 2 is a cross sectional view of an automatic transmission to which the present invention is applied.
Figure 3:
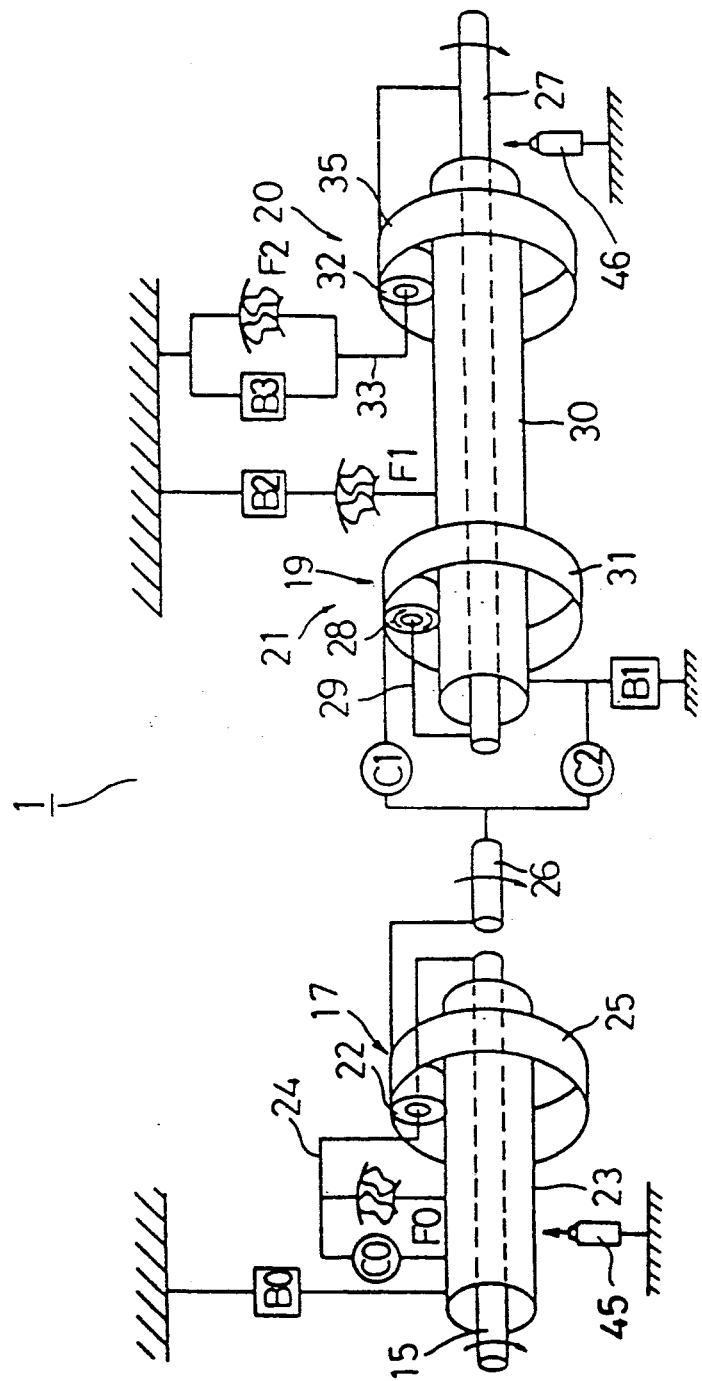
FIG. 3 is a schematic representation of the automatic transmission of FIG. 2.

An automatic transmission 1, as shown in FIGS. 2 and 3, has a torque converter 2, a planetary transmission gear mechanism 3 and a hydraulic control device 5 which are housed in a converter housing 6, a transmission case 7, an extension housing 9, a valve body 10 and an oil pan 11. The torque converter 2 has a lock-up clutch 12, so that rotation of an input member 13 is transmitted to an input shaft 15 of the transmission gear mechanism 3 through hydraulic flow of the torque converter 2 or the lock-up clutch 12. The shift gear mechanism 3 comprises a main transmission unit 21 including an over-drive planetary gear unit 17, a front planetary gear unit 19 and a rear planetary gear unit 20. The over-drive planetary gear unit 17 comprises a planetary pinion 22, a carrier 24 which is directly connected to the input shaft 15 and supports the pinion 22, a sun gear 23 which encloses the input shaft 15, and a ring gear 25 which is connected to an input shaft 26 of the main transmission mechanism 21. An over-drive direction clutch CO and a one-way clutch FO are situated between the carrier 24 and the sun gear 23, and an over-drive brake BO is situated between the gun gear 23 and the case 7. The front planetary gear unit 19 comprises a planetary pinion 28, a carrier 29 which is directly connected to an output shaft 27 and supports the pinion 28, a sun gear 30a which encloses the output shaft 27 and is constituted integrally with a sun gear 30b of the rear planetary gear unit 20, and a ring gear 31 which is connected to the input shaft 26 through a forward clutch Cl. A direct clutch C2 is situated between the input shaft 26 and the sun gear 30, a second-coast brake B1 is composed of a band brake is situated between the sun gear 30 and the case 7, a one-way clutch F1 and a second brake B2 are radially situated between the sun gear 30 and the case 7. The rear planetary gear unit 20 comprises a planetary pinion 32, a carrier 33 which supports the pinion 32, a sun gear 30b, and a ring gear 35 which directly connects to the output shaft 27. A first and reverse brake B3 and a one-way clutch F2 are situated radially between the carrier 33 and the case 7. Incidentally, 36 in FIG. 2 is an oil pump.

As shown in FIG. 2, with regard to the over-drive planetary gear unit 17, the one-way clutch FO is situated between a boss 23a of the sun gear 23 and a sleeve 24a of the carrier 24. A flange member 40 which constitutes a cylinder is extended from the boss 23a. The flange member 40 encloses a piston member 41 to form a hydraulic actuator or servo HCO of the clutch CO, the over-drive direct clutch CO is situated between the sleeve 24a and an inner surface of the flange 40. The over-drive brake BO is situated between an outer surface of the flange 40 and the case 7. Furthermore, a rim 42 is fixed on a peripheral part of the flange 40. A noncontacting type sensor 45 such as one employing light or magnets or the like is situated on the case 7 so that the sensor 45 faces plural through holes or slits which are formed on the rim 42. The sensor 45 is situated to detect the rotation speed of the clutch CO, in other words, to detect rotation speed of the rim 42 which rotates together with the input member 15 at the first, second and third speeds.

A speed sensor 46 which detects vehicle speed is situated in the extension case 9. Signals of the sensors 45 and 46 and other sensors are sent to a control unit C to control solenoid valves S1, S2, S3 and S4 which are explained later.

A gear selection lever, an accelerator pedal, a brake pedal and so on are arranged at a driver's seat (not shown). The selection lever is connected to and operates on a manual valve 51 (see FIG. 4), which will be explained hereinafter, to shift to each range such as neutral N, drive D, reverse R, second 2, low L and parking P. Among shifting operations, especially the operation from N to D and R range are sensed by a position sensor 47 (see FIG. 1). The accelerator pedal is connected to a throttle and a throttle valve 53 (see FIG. 4) with wires. The opening ratio of the throttle is sensed by a throttle sensor 49. The throttle sensor 49 is a starting sensor which senses the starting operation of the driver. However, other sensors, for example, a sensor sensing the releasing operation of the brake pedal, is also usable as a starting sensor.

Figure 4:
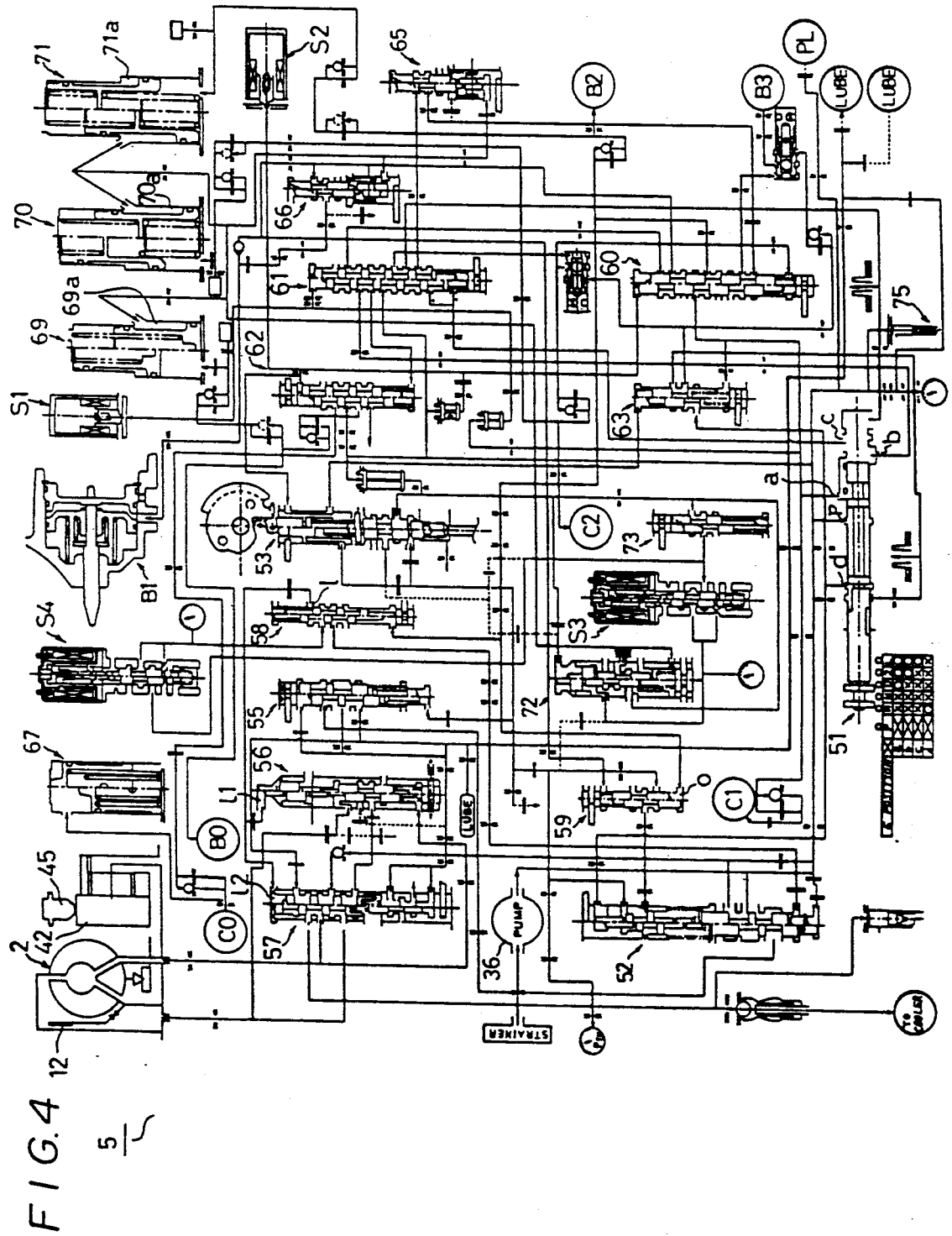
FIG. 4 is a hydraulic circuit diagram of the automatic transmission.

Next, the hydraulic control device 5 is explained along with FIG. 4.

HC0, HC1 and HC2 are hydraulic servos for each clutch, HB0, HB1, HB2 and HB3 are hydraulic servos for each brake, and 2 is the torque converter, 12 is the lock-up clutch, 36 is the oil pump. 51 is the manual valve where a line pressure port p is connected to ports a, b, c and d which correspond to ranges of R, P, N, D, 2 and L, as shown in the table in FIG. 4. 52 is a primary regulator valve which relates to the present invention and regulates the line pressure to each hydraulic servo. The structure of the valve 52 will be explained later. 53 is a throttle valve, 55 is a secondary regulator valve, 56 is a lock-up control valve, 57 is a lock-up relay valve, 58 is a solenoid relay valve, 59 is a cutback valve. 60 is a 1-2 shift valve, 61 is a 2-3 shift valve, 62 is a 3-4 shift valve, 63 is a reverse inhibit valve, 65 is a low-coast modulator valve, 66 is a second-coast modulator valve. 67 is an accumulator for the clutch CO, 70 is an accumulator for the clutch C2, 71 is an accumulator for the brake B2. 72 is an accumulator control valve which regulates hydraulic pressure applied to back pressure chambers 69a, 70a and 71a of the accumulators 69, 70 and 71, respectively, and controls the low-coast modulator valve 65 and the second-coast modulator valve 66. S1 and S2 are solenoid valves to control the shift valves 60, 61 and 62. S3 is a linear solenoid which regulates hydraulic pressure from the solenoid regulator valve 73 and applies regulated pressure to the accumulator control valve 72. S4 is a linear solenoid valve which applies hydraulic pressure to the lock-up control valve 56 and the lock-up relay valve 57 and performs the line pressure control which will be explained later.

Figure 1:
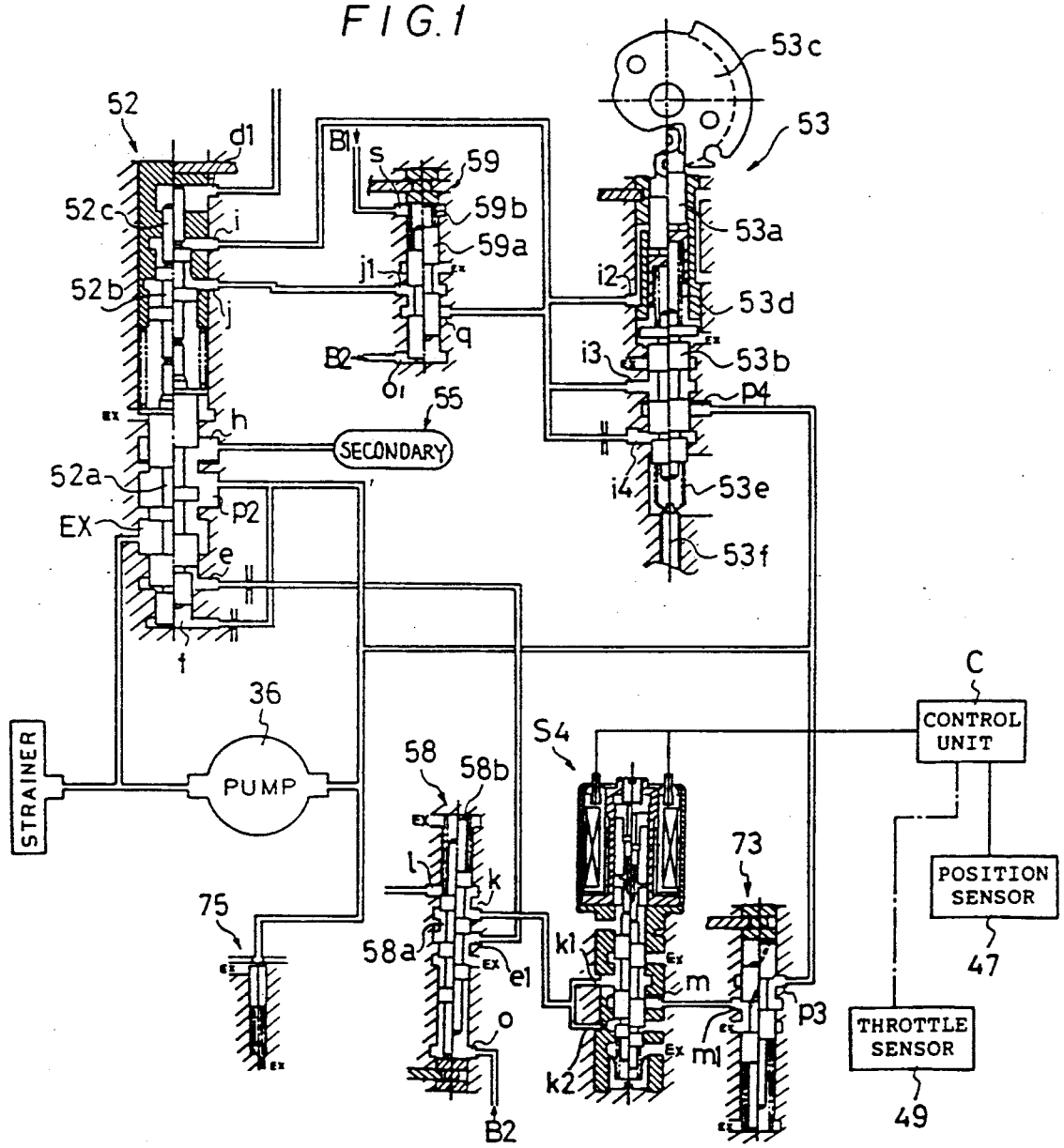
FIG. 1 is a hydraulic circuit diagram of a line pressure control device according to the present invention.

An explanation of the line pressure control will be given with respect to FIG. 1.

The primary regulator valve 52 has three movable members: a main spool 52a, a sub spool 52b and a plug 52c which contact each other and move together. Along the main spool 52a are provided a feedback port f applying hydraulic chamber port e applying hydraulic pressure to a step-like area of the main spool 52a, a line pressure port p2, a port h connected to the secondary regulator valve 55 and a drain port EX. Furthermore, along the sub spool 52 are provided a throttle pressure port i applying hydraulic pressure to the top of the sub spool 52b and a cutback pressure port j applying hydraulic pressure to a step-like area of the sub spool 52b. The plug 52c has an R range line pressure port d1 which applies hydraulic pressure at the top of the plug 52c.

The line pressure port p2 is connected to an output side of the oil pump 36 to regulate the pump pressure to be a line pressure and can connect to each hydraulic servo HC0, HC1, HC2, HB0, HB1, HB2 and HB3. This line pressure is applied to an input port p3 of the solenoid modulator valve 73, a line pressure port p4 of the throttle valve 53 and also to a pressure relief valve 75. The hydraulic pressure from the port h is first applied to a secondary regulator valve 55 where the pressure is regulated as a converter pressure, then applied to the torque converter 2 through the lock-up relay valve 57. When the manual valve 51 is positioned in the R range, the R range line pressure port d1 is connected to the port d of the manual valve 51 where the line pressure is applied (see FIG. 4).

In the solenoid relay valve 58, a spool 58a is pressed downward by a spring 58b. The solenoid relay valve 58 has at its bottom end a control chamber o connected to the second brake hydraulic servo HB2, an input port k, a first output port el, a drain port EX, and a second output port 1. The input port k is connected to both ports k1 and k2 of the lock-up solenoid valve S4, the first output port el to the control chamber port e of the primary regulator valve 52 and the second output port 1 to control chambers 11 and 12 of the lock-up control valve 56 and the lock-up relay valve 57 as shown in FIG. 4. The lock-up solenoid valve S4 is composed of a linear solenoid valve. The valve S4 has an input port m, an output port k1, a throttle port k2 and a drain port EX. Hydraulic pressure applied to the input port m is regulated by electric signals from the control unit C and the regulated pressure is taken out from the output port k1. A hydraulic pressure from the port m1 where the line pressure (p3) is reduced to a certain value by the solenoid modulator valve 73 is applied to the input port m of the valve S4.

The throttle valve 53 is composed to two movable members: a downshift plug 53a and a spool 53b. A throttle cam 53c connected to the acceleration pedal by wires or the like is arranged on the top of the plug 53a, where the throttle pressure is applied from the port i2 to act as a power assist mechanism which reduces the pressing force of the throttle cam 53c. A line pressure port p4, a throttle pressure port i3, a drain port EX and a feedback port i4 formed at a step-like section are all provided along the spool 53b. According to the rotation of the throttle cam 53c, the spring 53d is pressed through the plug 53a, this pressing force moves the spool 53b to balance the pressing force of the spring 53d, and the hydraulic pressure of the feedback port i4 and a lower end spring 53e. Namely, based on the movement of the spool 53b according to the rotation of the throttle cam (throttle pedal), the line pressure at the port p4 is regulated to be a throttle pressure, and the throttle pressure is taken out from the throttle pressure port i3. Incidentally, the lower end spring 53c can be adjusted by a screw 53f.

With reference to the cutback valve 59, a spool 59a is pressed downward by a spring 59b. An upper control chamber s which is connected to the second brake hydraulic servo HB1 is formed at the top end of the spool 59a, while at the bottom end of the spool 59a, a lower control chamber o1 is formed. Furthermore, the cutback valve 59 has an input port q1, an output port j1 and a drain port EX. The lower control chamber o1, as shown in FIG. 4, is connected to the second brake hydraulic servo HB2 as well as the control chamber o of the solenoid relay valve 58.

The operation of the embodiment will now be explained.

The solenoid valves S1, S2 and S4, the clutches C0, C1 and C2, the brakes B0, B1, B2 and B3 and the one-way clutches F0, F1 and F2 are operated in various combinations at the positions of P, R, R (speed is more than 7 km/h), N, D, 2 and L ranges, as shown in FIG. 5.

In other words, at the first speed of the D or 2 range, the solenoid valve S1 is ON, so that the overdrive direct clutch C0, the one-way clutch F0, F2 and the forward clutch C1 are engaged, and the other elements are all released. Accordingly, all elements of the overdrive planetary gear unit 17 rotate together through the clutch C0 and the one-way clutch F0, and thus rotation of the input shaft 15 is transmitted to the input shaft 26 of the main transmission unit 21 without reducing rotation speed. At the main transmission unit 21, rotation of the input shaft 26 is transmitted to the ring gear 31 of the front planetary gear unit 19, and transmitted to the carrier 29 and the output shaft 27 which is integrally connected with the carrier 29. At the same time, the rotation is transmitted to the carrier 33 of the rear planetary gear unit 20, and the carrier 33 is provided with torque in the left rotational direction. However, the carrier 33 is restrained by the one-way clutch F2, and thus the planetary pinion 32 rotates, and this rotation is transmitted to the ring gear 35 which is integrally connected with the output shaft 27.

When the manual valve 51 is moved from the N range to the D range by the electric signals of the position sensor 47, certain electric signals are sent from the control unit C to the linear solenoid valve S4. The hydraulic pressure from the output port m1 of the solenoid modulator valve 73 is applied to the port m of the valve S4 and regulated to a certain pressure, and taken out from the port k1, and furthermore the pressure is applied to the port k of the solenoid relay valve 58. At this moment, the relay valve 58 is in the left half position because no hydraulic pressure is applied to the control chamber 'o' because the second brake is released. Consequently, the pressure at the port k is applied to the control chamber e of the primary regulator valve 52 through the port el. In this state, in the primary regulator valve 52, the throttle pressure applied from the throttle valve 53 is applied to the port i, and the throttle pressure is also applied to the port j through the port q and the port j1 of the cutback valve 59 which is in the left half position based on the second-coast brake B1 and the second brake B2 being released. Accordingly, the spool 52a is pressed downward, so that the primary regulator valve 52 is in the condition that comparatively high line pressure for the first speed is generated. However, as the control pressure is applied to the control chamber e, the line pressure for the first speed is reduced by a certain amount. Because of these motions, when the manual valve 51 is changed from the N to the D range, the line pressure is reduced, and thus the pressure applied to the overdrive direct clutch hydraulic servo HCO and the pressure applied to the forward clutch hydraulic servo HC1 are reduced, so that the engagement of these clutches is smooth. Subsequently, the control pressure from the linear solenoid valve S4 is gradually reduced by the timer control so that the line pressure from the primary regulator valve 52 goes back to normal. Thus, the further engagement of these clutches is secured. In this state, as the cutback valve 59 is in the left half position, the ports q and j1 are connected, and the throttle pressure from the throttle valve 53 is applied to the cutback pressure port j of the primary regulator valve 52 through the above ports q and j1. Accordingly, the main spool 52a is pressed downward through the sub spool 52b, so the line pressure is set rather high to generate a strong engaging force of the clutch against high load at starting. Incidentally, one possible operation is that the control unit C sends electric signals after receiving electric signals from a starting sensor such as the throttle sensor 49, if a driver has no intention to start such as by pressing the accelerator pedal, the line pressure is kept just under the engaging pressure of the clutches C0, C1 to prevent a creeping phenomenon which occurs when changes from the N to the D range.

At the second speed of the D range, the solenoid valve 52 is ON in addition to the solenoid valve S1. The overdrive direct clutch C0, the one-way clutch F0, the forward clutch C1, the one-way clutch F1 and the second brake B2 are engaged, and other elements are all released. Accordingly, the overdrive planetary gear 17 is still kept under the direct operating condition, and the rotation of the input shaft 15 is transmitted to the input shaft 26 without reducing rotation speed. At the main transmission unit 21, rotation of the input shaft 26 is transmitted to the ring gear 31 through the forward clutch C1, and the sun gear 30 is provided with torque in the left rotational direction through the pinion 28. However, the sun gear 30 is restrained against movement in the left rotational direction by the operation of the one-way clutch F1 because of engagement of the brake B2, and consequently the planetary pinion 28 and the carrier 29 rotate. Then the rotation of the carrier 29 is directly transmitted to the output shaft 27, namely the rotation is transmitted only through the front gear unit 19 to the output shaft 27.

In this state, because the line pressure is applied to the second brake hydraulic servo HB2, the line pressure is applied to the control chamber of the solenoid relay valve 58, and thus the valve 58 is in the right half position. The input port k and the second output port 1 are connected, and the control pressure from the linear solenoid valve S2 is ready to be applied to the control chambers 11 and 12 of the lock-up control valve 56 and the lock-up relay valve 57. Due to these conditions, the lock-up solenoid valve S4 is controlled by electric signals from the control unit C based on electric signals from the speed sensor 46 and the throttle sensor 49 and the like, and subsequently the lock-up clutch 12 is controlled.

Because the line pressure is applied to the second brake hydraulic servo HB2, the cutback valve 59 is switched to the right half position by application of the line pressure to the control chamber o1. Under this state, the throttle port q is closed, and the port j1 is connected to the drain port EX, and accordingly the port j of the primary regulator valve 52 is in a draining condition. In the primary regulator valve 52, the pressing force on the spool 52a is reduced, so that the line pressure is set rather low in accordance with the second speed or greater. When the speed stage is more than the second speed, i.e. the second, third and fourth speeds, as the line pressure is applied to the second brake hydraulic servo HB2, the line pressure is still kept under this low condition.

At this moment, when friction plates of the second brake B2 start to contact by application of hydraulic pressure to the HB2 hydraulic servo, the output torque varies, and as a result, rotation speed of the flange 40 which rotates together with the input shaft 15 also varies. The variation in rotation is detected by the sensor 45, and then the solenoid valve S3 is controlled by the electric signals of the control unit C based on the signals of the sensor 45. Consequently, hydraulic pressure applied from the solenoid modulator valve 73 is regulated in the solenoid valve S3 and such regulated pressure is taken as a certain control hydraulic pressure, and the certain control pressure is applied to the control port of the accumulator control valve 72. The control valve 72 is in the state that the line pressure is applied to the back pressure chamber 71a of the accumulator 71, and the state changes to that in which the control pressure is applied to the back pressure chamber 71a. Then the accumulator back pressure is reduced by a certain time and amount, and after a certain time, based on the control pressure from the linear solenoid valve S3, the accumulator back pressure is gradually reduced, so that the output torque is smoothly varied. Thus, when shifting from the first speed to the second speed, shift-shock caused by engaging the second brake B2 is reduced, so that shift-up operation is smooth. In addition to shifting up from the first to the second speed, reduction of shift shock is obtained when shifting from the second to the third speed, from the third to the fourth speed and when downshifting.

At the third speed of the D or second range, the solenoid valve S1 is OFF, the overdrive direct clutch C0, the one-way clutch F0, the forward clutch C1, the direct clutch C2 and the second brake B2 are engaged, and other elements are all released. As a result, the overdrive planetary gear unit 17 is in the direct operating condition, and in the main transmission mechanism 21, the elements of the front planetary gear unit 19 rotate together because the clutch C1 and C2 are engaged, and thus rotation of the input shaft 26 is transmitted to the output shaft 27 without reducing rotation speed.

At the fourth speed of the D range, or the highest shift stage, the solenoid valve S2 is also OFF, and the forward clutch C1, the direct clutch C2, and the second brake are engaged. The main transmission mechanism 21, the same as the third speed, is in the direction operating condition, while at the overdrive planetary gear unit 17, the direct clutch C0 is released and the overdrive brake B0 is engaged. Accordingly, the sun gear 23 is locked by the brake B0, the planetary pinion 22 rotates with the carrier 24, and then rotation is transmitted to the ring gear 25 as an overdrive rotation, and the overdrive rotation is transmitted to the input shaft 26 of the main transmission mechanism 21 which is in the direct operating condition.

When the manual valve 51 is shifted to the second range, the first and third speeds are the same as those of the D range. When shifted to the second speed, the second-coast brake B1 is engaged in addition to the forward clutch C1, the overdrive direct clutch C0 and the second brake B2, so that the sun gear 30 of the main transmission mechanism 21 is restrained to actuate the engine brake. In the table of operation of FIG. 5, as shown in parentheses (1 ST), the first speed is provided in the second range; however, it is preferable for the second range to start from the second speed.

At this moment, because of the engagement of the second-coast brake B1, as the line pressure is applied to the upper control chamber s of the cutback valve 59, even if the line pressure is applied to the lower control chamber o1 due to the engagement of the second brake B2, the cutback valve 59 is kept in the left half position by the pressing force of the spring 59b. Accordingly, the cutback pressure is applied through the ports q, j1, to the port j of the primary regulator valve 52, and thus the primary regulator valve 52 generates comparatively high line pressure as in the first speed of the D range. Each clutch and brake are provided with strong engaging forces. Such strong forces function effectively when a vehicle tries to get out from tire ruts or when starting on snowy roads from the second speed by setting the manual valve 51 in the second range.

When the engine brake is actuated, based on electric signals from the speed sensor 46, the control unit C sends electric signals to the linear solenoid valve S3, so that the solenoid valve S3 generates certain hydraulic pressure according to a vehicle speed. The certain pressure from the solenoid valve S3 is applied to the accumulator control valve 72. The valve 72 reduces the line pressure by a certain amount and sends this reduced pressure to the control port. The pressure at the control port is applied to the control chamber of the second-coast modulator valve 66, and hydraulic pressure from the output port of the valve 66 is regulated, and this regulated pressure is applied to the second-coast brake hydraulic servo HB1. Due to these motions, the modulator valve 66 reduces the hydraulic pressure to the servo HB2 in accordance with the vehicle speed, so that the second-coast brake B2 reduces its torque capacity corresponding to the slowing down of the speed, and the engine brake is smoothly actuated.

At the second speed of the L range, the operation is the same as the second range of the S range. At the first speed, the first and reverse brake B3 is engaged in addition to the forward clutch C1 and the overdrive direct clutch C0, so that the carrier 33 of the rear planetary gear unit 20 is restrained, and thus, the engine brake is actuated. At this moment, based on electric signals of the speed sensor, the regulated pressure from the output port of the modulator valve 65 is reduced proportional to the vehicle speed, and this reduced pressure is applied to the hydraulic servo HB3. The first and reverse brake B3 actuates the engine brake with a large torque capacity when running fast, while at the time of a reduction of vehicle inertial force due to slowing down of the speed, the brake B3 adequately actuates the engine brake with reducing torque capacity.

At the reverse range, the overdrive clutch C0, the one-way clutch F0, the direct clutch C2 and the first and reverse brake B3 are engaged, and other elements are all released. Accordingly, the overdrive planetary gear unit 17 is in the direct operating condition, and in the main transmission mechanism 21, rotation of the input shaft 26 is directly transmitted to the sun gear 30 through the clutch C2, and as the carrier 33 is restrained by the brake B3, the rotation of the sun gear 30 is transmitted to the ring gear 35 as reverse rotation through the pinion 32 which rotates, and thus the output shaft 27 rotates reversely.

When the manual valve 51 is shifted from the N to the R range, because of electric signals of the control unit C to which signals from the position sensor 47 are sent, the linear solenoid valve S4 generates a certain control hydraulic pressure. Also in the R range, the solenoid relay valve 58 is in the left half position, so that the ports k and e1 are connected, the control pressure of the linear solenoid valve S4 is applied to the control chamber e of the primary regulator valve 52 through these ports k and e1, and thus the line pressure is reduced by a certain amount. Thus the shift shock at the shifting operation from the N to the R range is prevented.

At the R range, the line pressure is applied to the port d of the manual valve 51, and the line pressure at the port d is applied to the R range line pressure port d1 of the primary regulator valve 52. Even if the throttle pressure from the cutback valve 59 is not applied, the main spool 52a is pressed downward strongly through the plug 52c and the sub spool 52b so that the line pressure is set higher than for the first speed condition. Then the overdrive direct clutch C0, the direct clutch C2 and the first and reverse brake B3 generate strong engaging forces corresponding to the gear ratio.

When the manual valve 51 is shifted to the R range, if the vehicle speed is over a certain level, for example 7 km/h, the solenoid valve S2 is ON, so the direct clutch C2 is released, and as a result, no reverse running condition occurs.

TECHNICAL ADVANTAGES OF THE INVENTION

As explained, the present invention comprises the following: the primary regulator valve 52 has the cutback pressure port j which enables regulation of the line pressure to increase it, and the cutback pressure is applied from the cutback valve 59. Due to the above arrangement, high load torque can be handled by increasing the line pressure for the first speed, and the line pressure at the second speed can be set rather lower to prevent shift shock, while a simple two-stage spool 53b is employed in the output-responding valve (throttle valve 53), so that the precision of regulation of the hydraulic pressure relative to the engine output is improved and valve sticking due to foreign materials is surely prevented. The line pressure is controlled by the cutback pressure which is directly applied to the primary regulator valve 52, so that hydraulic response is enhanced and improved.

The primary regulator valve 52 has the main spool 52a, the subspool 52b and the plug 52c, and one end of the plug is at inlet d1, one end of the sub spool is at inlet i and the step-like section is at inlet j, and one of the three operates to increase the line pressure at one relevant operation. So at the R range and the first speed, adequate line pressure control is conducted, while such three simple movable members are employed, the hydraulic pressure is applied to comparative large areas, so that hydraulic precision is enhanced and valve sticking caused by foreign materials is surely prevented.

With reference to the cutback valve 59, the second control chamber s is formed at the opposite end from the first control chamber o1, and the chamber s is connected to the second-coast brake hydraulic servo HB1, so that at starting from the second speed of the 2 range, the increased line pressure provided by the cutback valve can be applied to the servo HB1. Strong engaging force is generated, so that escape from a tire rut or starting on a snowy road are securely and precisely performed.

The cutback valve 59 can generate the cutback pressure at both the first and second speed; however, the spring 59b is housed only in the second control chamber, so that the structure is not complicated to achieve the above functions at a low production cost.

Regarding the primary regulator valve 52, the control chamber at port e is provided, and the control pressure from the linear solenoid valve S4 which is controlled by electric signals of the position sensor 47 is applied to the port e at the required moment, so that the line pressure which is released from the primary regulator valve 52 is controlled to prevent selection shock. The device can be constructed simply without adding extra valves. Furthermore, the selection shock when shifting from the N to the R range is prevented as well as that during shifting from the N to the D range.

The regulating valve to control the lock-up clutch 12 is the solenoid valve S4, and the control pressure from the solenoid valve S4 is applied to the control chamber 3 of the primary regulator valve 52 through the solenoid relay valve 58. Due to this arrangement, as the solenoid valve S4 which does not operate when shifting from the N to the D range, can be utilized when shifting from the N to the R range, so that the structure of the device is further simplified.

In the case that the solenoid relay valve 58 is switched by the pressure applied to the second brake hydraulic servo HB2, the valve 58 is easily and securely switched. When switching from N to D and N to R ranges, selecting shocks are surely prevented, and at speeds greater than the second speed, the lock-up clutch 12 is securely operated and controlled.

We claim:

1. A hydraulic control device for an automatic transmission, comprising:
   hydraulic fluid servos for clutch and brake engagement and release of elements of a transmission gear mechanism;
   a hydraulic fluid circuit for supplying line pressure to said hydraulic fluid servos;
   a primary regulator valve connected to said hydraulic fluid circuit for regulating the line pressure supplied to the hydraulic fluid servos, and having a cutback pressure port for receiving a cutback pressure at a predetermined transmission speed and a throttle pressure port for receiving a throttle pressure;
   an output-responsive valve responsive to the output torque of an engine driving said automatic transmission and connected to said hydraulic fluid circuit for modulating the line pressure into a throttle pressure corresponding to the output torque of the engine, said output-responsive valve having a throttle pressure outlet connected to said throttle pressure port of said primary regulator valve for supplying throttle pressure for regulating the line pressure in response to the engine torque; and
   a cutback valve connected between the throttle pressure outlet of said output-responsive valve and said cutback pressure port of said primary regulator valve and operable in response to a predetermined transmission speed for supplying a cutback pressure to said primary regulator valve at the predetermined transmission speed to increase the line pressure, whereby the primary regulator valve regulates the line pressure so as to increase the line pressure at the predetermined transmission speed in response to both the throttle pressure and the cutback pressure.

2. A hydraulic control device as claimed in claim 1 in which said transmission has a second speed of forward running, and said output-responsive valve is a throttle valve operable in response to a throttle opening of the engine for driving the automatic transmission, and said cutback valve has an input port connected to said throttle pressure output and an outlet port connected to said cutback pressure port, and said cutback valve is connected to one of said elements for, in response to operation of the element for causing said transmission to operate at a speed greater than the second speed, changing over said cutback valve for disconnecting said input port and said output port.

3. A hydraulic control device as claimed in claim 1 in which said cutback valve has:
   a spool;
   a biasing means for biasing said spool in one direction;
   a first control chamber for receiving a fluid therein for biasing said spool in a second direction opposite said one direction;
   a second control chamber for receiving a fluid therein for biasing said spool in said one direction;
   an inlet port connected to the throttle pressure outlet for being supplied with throttle pressure;
   an output port connected to said cutback pressure port for supplying cutback pressure to said primary regulator valve; and
   a drain port for exhausting the throttle pressure,
   said first control chamber being connected to one of said hydraulic servos for being supplied with a line pressure therefrom when said transmission is operated at a speed greater than the second speed, and said second control chamber is connected to a brake hydraulic servo for a second-coast brake for being supplied with line pressure therefrom to cause said spool to move to close off said drain port and connect said inlet port and said output port for supplying cutback pressure to said primary regulator valve to increase the line pressure at a second speed of coast.

4. A hydraulic control device as claimed in claim 3 in which said biasing means is a spring at one end of said spool for biasing said spool in said one direction, said first control chamber being provided at the other end of said spool and said second control chamber being provided at said one end of said spool.

5. A hydraulic control device for an automatic transmission, comprising:
   hydraulic fluid servos for clutch and brake engagement and release of elements of a transmission gear mechanism;
   a hydraulic fluid circuit for supplying line pressure to said hydraulic fluid servos;
   a primary regulator valve connected to said hydraulic fluid circuit for regulating the line pressure supplied to the hydraulic fluid servos, and having a cutback pressure port for receiving a cutback pressure at a predetermined transmission speed and a throttle pressure port for receiving a throttle pressure;
   an output-responsive valve responsive to the output torque of an engine driving said automatic transmission and connected to said hydraulic fluid circuit for modulating the line pressure into a throttle pressure corresponding to the output torque of the engine, said output-responsive valve having a throttle pressure outlet connected to said throttle pressure port of said primary regulator valve for supplying throttle pressure for regulating the line pressure in response to the engine torque; and
   a cutback valve connected between the throttle pressure outlet of said output-responsive valve and said cutback pressure port of said primary regulator valve and having a spool, biasing means for biasing said spool in one direction, a first control chamber for receiving fluid for biasing said spool in a second direction opposite said first direction at speeds greater than the second speed, said cutback valve being operable in response to first and second transmission speeds in forward speed ranges of said transmission speed for supplying a cutback pressure to said primary regulator valve at the first and second transmission speeds in the forward speed ranges to increase the line pressure, whereby the primary regulator valve regulates the line pressure so as to increase the line pressure at the first and second transmission speeds in the forward speed ranges in response to both the throttle pressure and the cutback pressure.

* * * * *

UNITED STATES PATENT AND TRADEMARK OFFICE
CERTIFICATE OF CORRECTION

PATENT NO. : 5,078,028

DATED : January 7, 1992

INVENTOR(S) : Kazunori ISHIKAWA et al.

It is certified that error appears in the above-identified patent and that said Letters Patent is hereby corrected as shown below:

On the title page:

ITEM: [75], for "Kaunori", read --Kazunori--.

Signed and Sealed this

First Day of June, 1993

Attest:

MICHAEL K. KIRK

Attesting Officer

Acting Commissioner of Patents and Trademarks